United States Patent [19]

Marx et al.

[11] Patent Number: 5,011,260
[45] Date of Patent: Apr. 30, 1991

[54] BUFFERED OPTICAL FIBER HAVING A STRIPPABLE BUFFER LAYER

[75] Inventors: M. Fred Marx, Dunwoody, Parry A. Moss; Stone Mountain; Mary J. Presnell; Atlanta; John W. Shea; Chamblee, all of Ga.

[73] Assignee: AT&T Bell Laboratories, Murray Hill, N.J.

[21] Appl. No.: 385,755

[22] Filed: Jul. 26, 1989

[51] Int. Cl.$^5$ .................. G02B 6/44; B05B 5/00; B05D 5/06; B65H 69/02
[52] U.S. Cl. .................. 350/96.23; 350/96.34; 427/163; 427/158; 156/158; 156/166; 156/180
[58] Field of Search .............. 350/96.10, 96.23, 96.30, 350/96.33, 96.34; 156/158, 166, 180; 427/163, 158

[56] References Cited

U.S. PATENT DOCUMENTS

| | | | |
|---|---|---|---|
| 3,864,018 | 2/1975 | Miller | 350/96.20 X |
| 4,037,922 | 7/1977 | Claypoole | 350/96.23 |
| 4,072,400 | 2/1978 | Claypoole et al. | 350/96.30 |
| 4,100,008 | 7/1978 | Claypoole | 156/180 |
| 4,147,407 | 4/1979 | Eichenbaum et al. | 350/96.34 |
| 4,305,642 | 12/1981 | Bloodworth et al. | 350/96.20 |
| 4,474,830 | 10/1984 | Taylor | 427/54.1 |
| 4,516,831 | 5/1985 | Meistring et al. | 350/96.23 |
| 4,538,881 | 9/1985 | Anctil et al. | 350/96.23 |
| 4,729,629 | 3/1988 | Saito et al. | 350/96.23 |

OTHER PUBLICATIONS

Technical Bulletin No. 1561 from Monsanto regarding a MODAFLOW ®.
Technical Bulletin designated PC-1344 from Monsanto discloses a defoamer referred to in lines 9-11 of p. 7 of the specification.

*Primary Examiner*—Brian Healy
*Attorney, Agent, or Firm*—Edward W. Somers

[57] ABSTRACT

A buffered optical fiber (20) includes an optical fiber (21) comprising a core and a cladding. Typically, the optical fiber is enclosed by at least one layer (23) of coating material. The optical fiber is enclosed by a plastic buffer layer (30). Interposed between the optical fiber and the buffer layer is a decoupling material (40) which provides a controlled coupling of the buffer layer to the underlying coating material. As a result, there is sufficient adhesion between the buffer layer and the underlying coating material to maintain the buffer layer in place during normal use of the buffered optical fiber. On the other hand, the adhesion is low enough so that the buffer layer may be removed upon the application of resonably low stripping forces. Advantageously, the decoupling material also allows the selective removal of the optical fiber coating material as well as the plastic buffer layer.

10 Claims, 3 Drawing Sheets

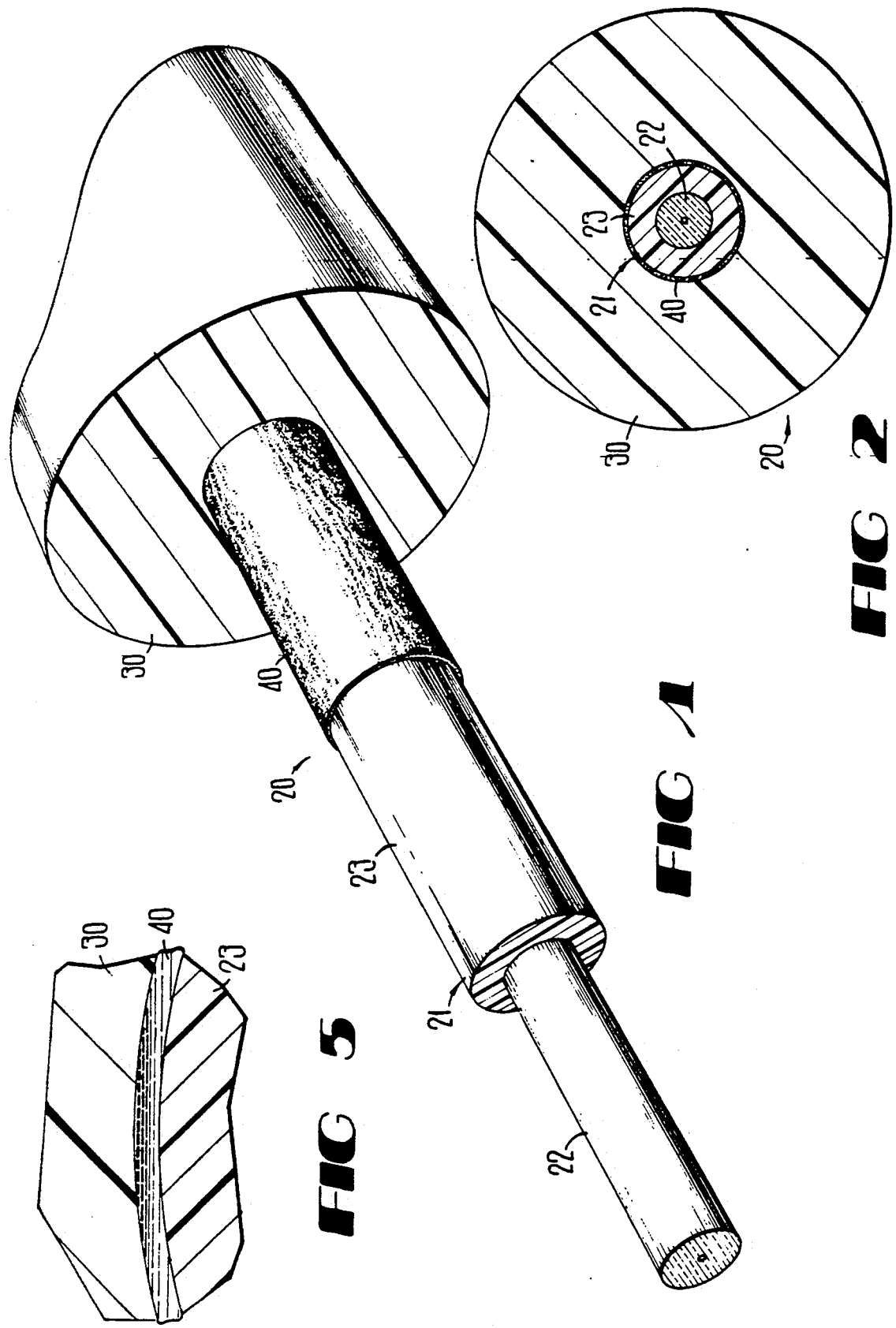

BUFFERED OPTICAL FIBER HAVING A STRIPPABLE BUFFER LAYER

TECHNICAL FIELD

This invention relates to a buffered optical fiber having a strippable buffer layer. More particularly, the invention relates to a buffered optical fiber having a buffer layer which has a controlled coupling to a coating material which encloses the optical fiber.

BACKGROUND OF THE INVENTION

Optical fiber now is in widespread use as communication media. Typically, an optical fiber includes a glassy core which may be on the order of 8 $\mu$m for single mode transmission or about 62.5 $\mu$m for multimode transmission and a cladding. About the cladding is disposed one or more layers of a coating material. The coating material or materials is used to protect the optical fiber. When an optical fiber is terminated by a ferrule for example, it becomes necessary to remove the coating material or materials from an end portion of the optical fiber.

An optical fiber cable includes a sheath system which protects an optical fiber, which extends along the longitudinal axis of the cable and which serves as an optical communications path. Not only does the sheath system protect the glass fiber, but also it provides the cable with flexibility and with suitable tensile, flexural and impact strength. For multi-fiber cables, the sheath system may include several extruded layers of plastic as well as one or more metallic shields disposed between elements of the sheath system.

Optical fibers of a cable may be terminated in any one of several ways. Each fiber may be terminated by a connector widely known as a biconic connector. Such a connector is disclosed in U.S. Pat. No. 4,512,630 which issued on Apr. 23, 1985 in the name of P. K. Runge. Another connector is one referred to as an ST ® connector, ST being a registered trademark of AT&T. Also useable is an array connector which terminates a planar array of optical fibers between two chips.

Single fiber cables also are well known in the art. They also may be terminated with biconic connector plugs or ST connectors. Generally, a single fiber cable includes a coated optical fiber which is enclosed in a buffer layer. The buffer layer typically is made of an extruded plastic material such as polyvinyl chloride. Such a single optical fiber cable generally is referred to as a buffered optical fiber. Over the buffer layer in another embodiment may be disposed a yarn which provides strength for the cable. The yarn may be an aramid fibrous yarn and is usually served in a helical fashion about an advancing buffered optical fiber. An outer jacket generally is extruded about the yarn.

Buffered optical fibers are used, for example, in central offices to connect cables to optical transmission apparatus. Also, buffered optical fibers may be used widely in buildings. For example, they may be used in riser cables which may comprise anywhere from two to thirty-six buffered fibers. Riser cables are used to interconnect cables which enter building equipment rooms to wiring closets on upper floors. Further, buffered optical fibers may be used in plenums which extend from the riser closets on each floor to satellite closets or directly to equipment and for connecting the equipment to plenum cables.

A still further use of buffered optical fibers is in the local area network. Therein, distribution cables extend from distribution cabinetry to drop closures and thence to terminal locations. Buffered fibers appear to be the choice for inclusion in those cables which extend from distribution cabinetry to each home, for example.

It has been found that buffered fiber cables are somewhat difficult to strip for connectorization. That is, difficulties have been encountered in the removal of the buffer layer from the coated optical fiber. This is particularly true in those instances where it is desired to expose a substantial length of optical fiber for particular connectorization arrangements.

The prior art dislcoses the use of a release agent for buffered optical fiber. In U.S. Pat. No. 4,072,400, a buffered optical waveguide fiber includes an optical waveguide fiber which is coated with a glass protective coating with a release agent coating applied over the glass protective coating. A protective layer of a thermoplastic synthetic resinous material surrounding the fibers is disposed over the release agent. As disclosed in the aforementioned U.S. Pat. No. 4,072,400, the release agent material may be any suitable lubricant such as silicone oil, petroleum lubricant, a layer of colloidal graphite, talc or the like.

Presently, when it is desired to remove the buffer layer, a stripping tool including opposed knife blades is manipulated to cause the blades to cut through the buffer layer. Afterwards, forces are applied to the tool to cause the buffer layer to be pulled from the optical fiber. However, because of the adhesion of the buffer layer to the coating material, the forces required to remove the buffer layer may cause the fiber to break, particularly when trying to remove about one inch of the buffer layer to expose sufficient optical fiber for termination purposes. Once the fiber is broken, the craftsperson must begin the process anew.

This problem has been overcome by removing the one inch length of buffering in incremental steps of one-sixteenth inch each, for example. As should be apparent, this is a time consuming procedure and alternatives have been sought after.

Another problem relates to the removal of the buffer layer and the underlying coating material from the optical fiber in a single operation. There are instances when not only is it desired to remove a length of the buffer layer from the underlying coated optical fiber but also the coating layer or layers as well. In fact in some installations, it becomes necessary to remove both the buffer layer and the coating layer or layers from a length of the underlying optical fiber and then to remove only the buffer layer from an adjacent portion of the buffered optical fiber. As should be apparent, the buffered optical fiber which is sought after must include provisions to facilitate the removal of the buffer layer or both the buffer layer and the coating materials from the optical fiber.

Of course, although the sought-after cable must be one in which the buffer layer or the buffer layer and the coating material must be able to be removed somewhat easily, the cable must also have other properties. For example, there must be sufficient adhesion between the buffer layer and the underlying coating material to maintain the buffer layer in place during normal use.

What is needed and what seemingly is not provided by the prior art is a buffered optical fiber which is relatively small in size. Further, the sought-after buffered optical fiber should be one in which the covering buffer material has a controlled coupling to an underlying coated optical fiber so that it may be removed easily to expose the optical fiber for connectorization. Still further, the sought-after buffered optial fiber should be one in which reasonable lengths of both the covering buffer layer and the coating layer or layers of the optical fiber may be removed desirably at the same time in a single operation without causing fracture of the fiber.

SUMMARY OF THE INVENTION

The foregoing problems of the prior art have been overcome with the buffered optical fiber of this invention. A buffered optical fiber cable of this invention includes a core comprising an optical fiber and a layer of a plastic buffering material which encloses the optical fiber. The optical fiber is enclosed in at least one layer of coating material. The plastic buffering material has a controlled coupling to the at least one layer of fiber coating material. As such, the plastic buffering material is maintained on the optical fiber during normal use but may be removed upon the application of relatively low stripping forces.

In a preferred embodiment, a layer of a decoupling material is interposed between the coated optical fiber and the buffering material. The decoupling material is such that it facilitates relative motion between the coating material and the buffer layer upon the application of suitable stripping forces. However, during normal use of the optical fiber, the decoupling material is such that there is sufficient adhesion between the plastic buffering material and the fiber coating material to cause the plastic buffering material to be maintained in place. Also, the decoupling material is such that there is insignificant migration of any of the decoupling material into the coating on the optical fiber or into the plastic buffering material.

As a result of the inclusion of the decoupling material, the buffering layer may be removed from the underlying optical fiber without damaging the optical fiber. Further, the decoupling material is such that if blades of a stripping tool are set to the correct depth, a reasonable length of the coating material as well as of the overlying buffering material may be removed together in a single operation.

BRIEF DESCRIPTION OF THE DRAWING

Other features of the present invention will be more readily understood from the following detailed description of specific embodiments thereof when read in conjunction with the accompanying drawings, in which:

FIG. 1 is a perspective view of a buffered optical fiber of this invention;

FIG. 2 is an end cross sectional view of the buffered optical fiber of FIG. 1;

FIG. 5 is a detail view of a portion of the buffered optical fiber of FIG. 1;

DETAILED DESCRIPTION

Figure 3:
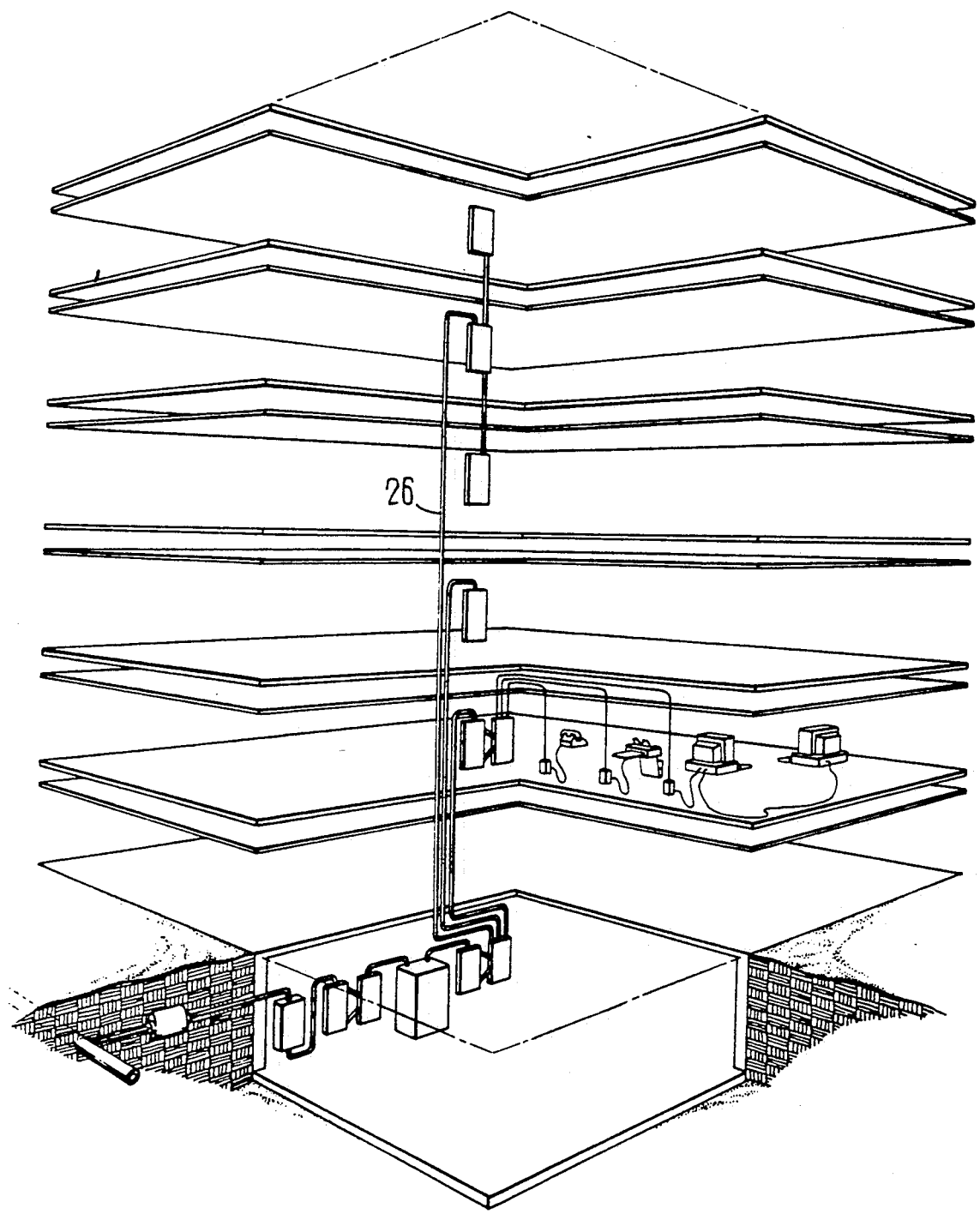
FIG. 3 is a schematic view of a building to show a use of the buffered optical fiber of this invention.

Referring now to FIGS. 1 and 2, there is shown a buffered optical fiber 20 of this invention. The buffered optical fiber 20 includes an optical fiber 21 which typically includes a core and cladding designated together by the numeral 22 and a UV cured protective coating 23 about the core and cladding. Of course, the optical fiber 21 may include more than one protective coating. See U.S. Pat. No. 4,474,830 which issued on Oct. 2, 1984, in the name of C. R. Taylor. One commonly available coated optical fiber has an outer diameter of about 0.010 inch.

As can be seen in FIGS. 1 and 2, the buffered fiber 20 also includes a jacket 30 which is referred to as a buffer layer. The buffer layer 30 is made of a plastic buffering material such as polyvinyl chloride. In the preferred embodiment, the buffer layer 30 has a wall thickness in the range of about 0.011 to 0.016 inch.

Figure 4:
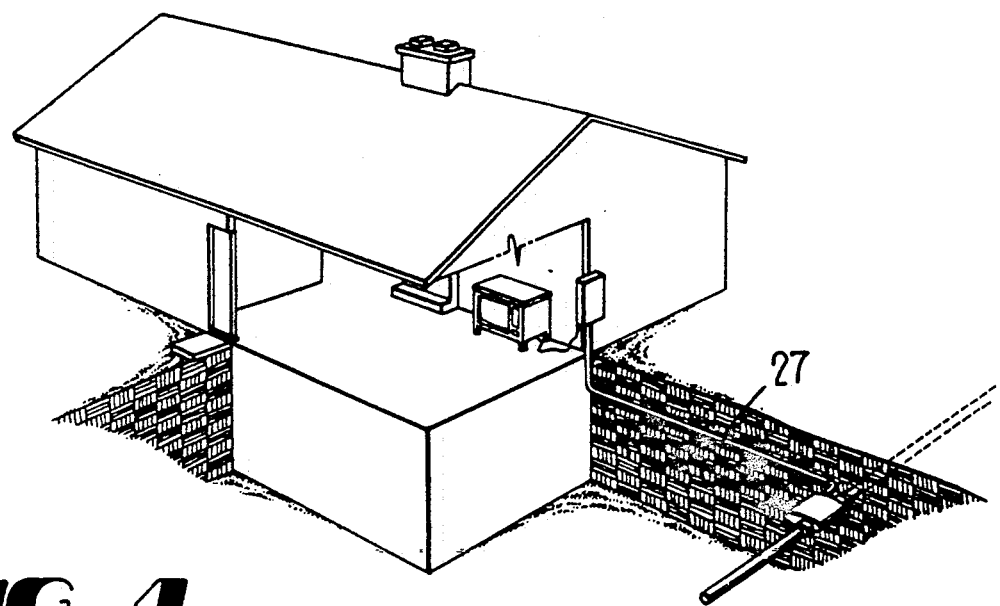
FIG. 4 is a schematic view of a cable extending to a customer's home, the cable including buffered optical fibers of this invention.

This invention is directed to a buffered optical fiber which may be used in a riser cable 26 (see FIG. 3) and in a cable 27 to the home (see FIG. 4), for example, and in which controlled coupling exists between the buffer layer 30 and the underlying coating material. As a result of the controlled coupling, there is enhanced strippability of the buffer layer 30 or of the buffer layer and the underlying optical fiber coating material. Not only are the buffering layer and, if desired, the coating material easily removable, but they are easily removable without inflicting damage to the optical fiber. On the other hand, suitable adhesion exists between the buffer layer 30 and the underlying coating material to maintain the buffer layer in place during normal expected handling and use of the buffered Optical fibers must be stripped of the buffering layer 30 and in many instances of their coating materials to facilitate connectorization. In some instances, it is desirable to provide a transition between optical fiber cables and optical fiber ribbons. In this procedure, as disclosed in U.S. Pat. No. 4,305,642, which issued on Dec. 15, 1981 in the names of L. B. Bloodworth, Jr., et al., a substantial length of the covering of the cable is removed to expose buffered optical fibers, for example. This is done in order to be able to position a plurality of optical fibers on a tape and to enclose them in a second tape to form a ribbon and allow connectorization with an array type connector such as is shown in U.S. Pat. No. 3,864,018 which issued on Feb. 4, 1975, in the name of C. M. Miller.

The strippability of a reasonable length of the buffer layer 30 and the underlying optical fiber coating or coatings in a single operation for termination purposes, for example, is provided by interposing a decoupling material 40 between the coated optical fiber and the jacket (see FIGS. 1, 2 and 5). Such a decoupling material should be one which facilitates the removal of a reasonable length of the buffer layer or buffer layer and coating material in one operation without causing damage to the optical fiber in the process of doing so.

The material used as the decoupling material should not be compatible chemically with adjacent materials, so that they do not dissolve in either the coating material or in the buffering material. Such behavior would result in the loss of the interlayer between the coating material and the buffering material, which interlayer provides the desired controlled bonding.

The decoupling material 40 may comprise a modified acrylic material such as an acrylate copolymer material, for example. In a preferred embodiment, the decoupling material is a composition which comprises an acrylate copolymer material available commercially as MODA-FLOW ® resin modifier from the Monsanto Company. The MODAFLOW ® resin modifier is a high molecular weight, low volatility, complex polymeric viscous liquid. MODAFLOW ® resin modifier is not water soluble, is soluble in Xylene, kerosene, isopropyl alcohol, petroleum ether and ether solvents and is virtually non-extractable.

MODAFLOW ® resin modifier is reported to be a copolymer blend of polyacrylates which is made form an acrylic acid and an alcohol to provide an ester which can be polymerized to make a resin. A polyacrylate is a thermoplastic resin made by the polymerization of an acrylic composition such as methyl methacrylate. Polymers of acrylic esters may be methyl, ethyl, butyl or 2-ethylhexyl. Such material of the preferred embodiment is reported to be an ethyl acrylate and 2-ethylhexyl acrylate copolymer or 2-propenoic acid ethyl ester, polymer with 2-propenoic acid, 2-ethylhexyl ester. Properties of this material are provided in an MSD brochure designated PC-1344 defoamer and in Technical Bulletin No. 1561 available from Monsanto.

For processing, about 2.5% by weight of an acrylate copolymer material is blended with about 97.5% by weight of a solvent. Preferably, the solvent is quick-drying and in the preferred embodiment, is acetone or an equivalent solvent. It is desired to include a fast-evaporating solvent which flashes off quickly.

The composition of the decoupling material also may include a trace amount, for example about 0.05%, of an optical brightener. Such a constituent is useful during manufacture and in field use, for example, to verify that the buffered optical fiber includes a decoupling material. This is accomplished by exposing a length of the buffered optical fiber 20 to ultraviolet light (UV) energy such as from a UV lamp.

Such a decoupling material, properly applied, provides sufficient adhesion to both the coating matrial and to the buffering material of the buffer layer 30. As a result, a completely unbonded buffer layer such as would result from the use of a release agent is avoided. At the same time, the adhesion is sufficiently low so that structural arrangements are possible where stripping of covering materials from the fiber may be accomplished readily.

The decoupling material 40 is relatively thin. In a preferred embodiment, the decoupling material has a thickness in the range of 0.3 to 0.5 μm. With a relatively thin layer of decoupling material, there is mechanical interaction of portions of the buffer layer with portions of the underlying coating material thereby causing controlled coupling between the two. If too thin, ther would be too much adhesion between the buffer layer 30 and the coating material and removal of the buffer layer would revert to the use of undesirable prior art techniques. On the other hand, if it is too thick, there would be complete separation of the buffer layer and the coating material and the buffer layer may slide relative to the coating material. It should be mentioned that inclusion of a solvent in the composition of the decoupling material facilitates the application of a relatively thin layer. By using a solvent, the solution of the decoupling material is diluted. Approximately 98% of the solution is evaporated thereby enabling the application of a thin layer.

The buffered optical fiber 20 which includes the decoupling material 40 overcomes problems of the prior art. As will be recalled, in order to terminate an optical fiber it usually is necessary to remove the buffer layer 30 from an end portion and more likely than not also to remove the optical fiber coating material from at least a portion of the end portion.

For example, it may be desired to remove about one inch of the buffer layer 30 and about ⅞ inch of the coating material. This may be done, for example, to allow the optical fiber which is bared of the coating material to be inserted into a terminating ferrule. The remaining ⅛ inch of the end portion which still includes coating material is used for strain relief.

Figures 6, 7:
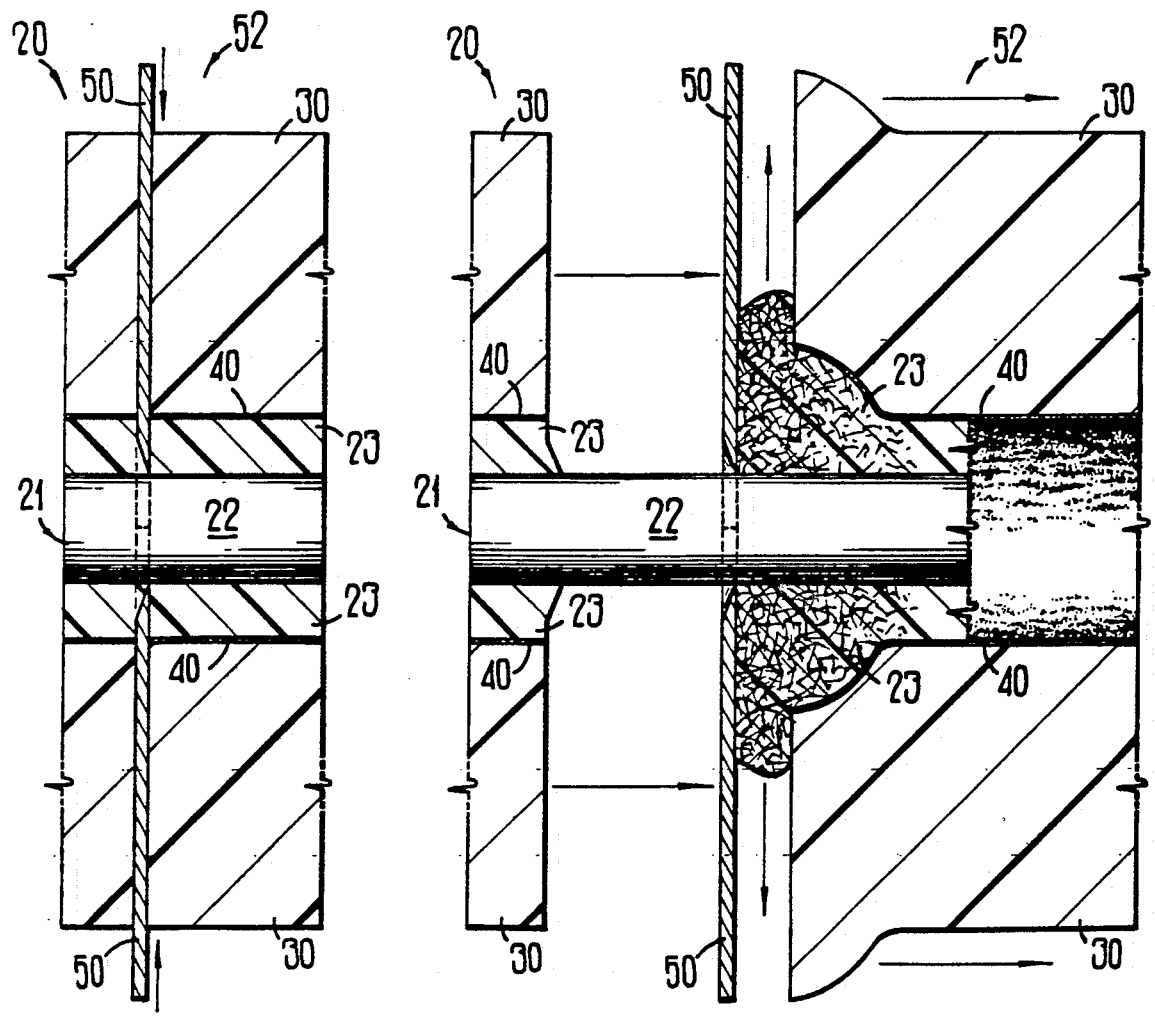
FIG. 6 is an enlarged view of a portion of the buffered optical fiber of FIG. 1 with blades of a stripping tool in position for a stripping operation.
FIG. 7 is an enlarged view of the portion of the buffered optical fiber of FIG. 6 after the blades have been moved to remove a buffer layer and coating material from an end portion.

Viewing now FIG. 6, it is seen that stripper blades 50—50 along an end portion 52 of a buffered optical fiber are caused to penetrate to a depth comprising the thickness of the buffer layer 30 plus a substantial portion of the coating thickness. Then the stripper blades 50—50 are caused to be moved to the right as viewed in FIG. 7. In the initial movement of the stripper blades 50—50 to the right, the buffer layer material of the end portion 52 tears or fractures from the buffer layer material of the remainder of the buffered optical fiber. The same action occurs with the coating material. Both the buffer layer and the coating materials then are free to be moved to the right.

If the buffer material remains adhered to the coating material, as in prior art buffered optical fibers, the coating material is compressed inside the buffer layer material, and the increasing volume of coating materials causes the buffer layer material to swell and, in some cases, split. The increased forces on the optical fiber of the end portion 52 caused by the compression of the coating material inside the buffering material during the stripping process generally are sufficient to cause the fiber to fracture.

When the stripping blades 50—50 are caused to penetrate the buffered optical fiber of this invention and be moved toward the free end of an end portion, the forces exerted on the system are sufficient to cause failure of the low coupling forces that exist between the buffer layer 30 and the coating material because of the disposition of the thin layer 40 of interface decoupling material therebetween. As a result, the buffer layer is able to move slidably easily to the right. A gap forms between the buffer layer on the end portion and the blades 50—50, and the coating material spurts outwardly through the gap.

This behavior appears to be confirmed by the observations that following stripping tests, relatively large amounts of coating material were found in the vicinity of the blades and the buffering material is removed as a tube. On the other hand, in the prior art where no interface decoupling material is present, relatively large amounts of coating material are found inside the buffering material which has expanded, in some cases split, and which is not removed from the fiber as a tube.

Afterwards, the stripper blades 50—50 are repositioned ⅛ inch from the end of the buffer layer plastic and caused to penetrate only the buffer layer plastic. Relative motion between the stripper blades 50—50 and the buffered optical fiber with the blades so positioned causes another ⅛ inch of the buffer layer plastic to be removed.

Although the buffered optical fiber 20 of this invention allows the removal of a reasonable length up to about two inches of the buffering and coating material in one operation, it also is especially useful when relatively long end portions of an optical fiber must be prepared for termination. Some of these may be as long as six inches. In the past, stripping of the buffering material or buffering material and coating was done in incremental steps. A craftsperson could have gone successfully through a number of steps only to break the fiber during the execution of the last step. Now, the entire end portion may be stripped with relative ease.

In order to accomplish this for a relatively lengthy end portion, after the stripper blades 50—50 have been moved through the buffer layer 30, the craftsperson assists manually the separation of the buffer layer on the end portion 52 from the remainder of the buffered optical fiber. The craftsperson grasps the buffer layer 30 on the end portion 52 and urges it toward the free end of the end portion. This is done because it would be difficult to cause the movement of the blades to cause the adhesion between the buffer layer and the underlying coating to fracture all the way to the end of the buffered fiber. Instead, manual assist is provided to remove the buffer layer. Afterwards, stripper blades are caused to penetrate the coating material and are moved to remove the coating material from the end portion.

It is important to recognize the versatility that the buffered optical fiber of this invention provides for the craftsperson and the designer. Almost any expected reasonable length may be stripped. Further, any combination of buffering material and coating material or buffering material alone may be removed as demanded to carry out a particular design termination.

The optical fiber cable of this invention is advantageous from the standpoint of connectorization. It may be terminated with a biconic connector which is disclosed in priorly mentioned U.S. Pat. No. 4,512,630. Also, it may be terminated by an ST ® connector.

The buffered optical fiber 20 of this invention also may be used to provide a multifiber cable. Such a cable may include a strength member system which may be metallic, for example, and which may be enclosed in a plastic material or which may include yarn such as KEVLAR ® yarn, for example. Arranged within a core may be a plurality of the buffered optical fibers 20—20. The plurality of buffered optical fiber 20—20 are enclosed by a jacket which is made of a plastic material. For connectorization, a portion of the jacket is removed and each of the buffered single fibers which thus becomes exposed is stripped and terminated with a connector. The biconic and/or ST connector may be used to terminate each of the buffered optical fibers of the cable.

It is to be understood that the above-described arrangements are simply illustrative of the invention. Other arrangements may be devised by those skilled in the art which will embody the principles of the invention and fall within the spirit and scope thereof.

We claim:

1. A buffered optical fiber, which comprises:
an optical fiber which includes at least one layer of a coating material; and
a plastic buffering material which encloses said optical fiber, said buffering material having a controlled coupling to said at least one coating layer of said optical fiber such that said plastic buffering material has suitable adhesion to said at least one coating layer during normal use but which is such as to allow removal of said plastic buffering material from said optical fiber upon the application of suitably low stripping forces.

2. A buffered optical fiber, which comprises:
an optical fiber which includes at least one layer of a coating material;
a plastic buffering material which encloses said optical fiber and said at least one coating layer; and
a layer of a decoupling material which is interposed between said at least one coating layer and said buffering material, said decoupling material being such that sufficient adhesion exists between said plastic buffering material and said at least one coating layer to maintain said plastic buffering material in place during normal use of said buffered optical fiber but which upon the application of suitably low forces allows said plastic buffering material to be removed.

3. The fiber of claim 2, wherein said plastic buffering material may be removed without removing said at least one layer of coating material.

4. The fiber of claim 3, wherein the removal of said plastic buffering material may be accomplished without damaging said at least one layer of coating material.

5. The fiber of claim 2, wherein said plastic buffering material may be removed together with said at least one layer of coating material.

6. The buffered optical fiber of claim 2, wherein said decoupling material being such that there is insignificant if any migration of said decoupling material into said coating material on said optical fiber or into said plastic buffering material thereby facilitating the removal of said plastic buffering material from said optical fiber.

7. The buffered optical fiber of claim 2, wherein said decoupling material is formed from a composition of matter comprising about 97½% by weight of a solvent and about 2½% by weight of an acrylate copolymer material.

8. The buffered optical fiber of claim 7, wherein said acrylate copolymer material is an ethyl acrylate and 2-ethylhexyl acrylate copolymer.

9. The buffered optical fiber cable of claim 7, wherein said solvent comprises acetone.

10. The buffered optical fiber of claim 7, wherein said decoupling material includes about 0.05% by weight of an optical brightener material.

* * * * *